(12) United States Patent
Harrington

(10) Patent No.: US 7,269,271 B2
(45) Date of Patent: Sep. 11, 2007

(54) METHOD FOR DIGITAL IMAGE ALTERATION DETECTION AND ORIGINAL DIGITAL IMAGE RECOVERY

(75) Inventor: Steven J Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 886 days.

(21) Appl. No.: 10/377,929

(22) Filed: Feb. 27, 2003

(65) Prior Publication Data

US 2004/0086196 A1  May 6, 2004

Related U.S. Application Data

(60) Provisional application No. 60/422,635, filed on Oct. 30, 2002.

(51) Int. Cl.
*G06K 9/00* (2006.01)
*G06K 9/36* (2006.01)
*G06K 15/00* (2006.01)

(52) U.S. Cl. .............. 382/100; 382/284; 358/3.28

(58) Field of Classification Search .............. 382/100, 382/276, 284; 345/634, 641; 358/3.28, 358/540
See application file for complete search history.

(56) References Cited

U.S. PATENT DOCUMENTS

| | | | | |
|---|---|---|---|---|
| 5,045,952 | A | 9/1991 | Eschbach | 358/447 |
| 6,128,411 | A | 10/2000 | Knox | 382/232 |
| 6,671,388 | B1 * | 12/2003 | Op De Beeck et al. | 382/100 |
| 6,731,774 | B1 * | 5/2004 | Hosaka et al. | 382/100 |
| 6,831,990 | B2 * | 12/2004 | Marvel et al. | 382/100 |
| 6,968,072 | B1 * | 11/2005 | Tian | 382/100 |

* cited by examiner

*Primary Examiner*—Colin LaRose
(74) *Attorney, Agent, or Firm*—Oliff & Berridge, PLC

(57) ABSTRACT

A first digital image is combined with a transformed first digital image to authenticate and reconstruct the first digital image. When viewed in the standard manner, the combined image appears to be the first digital image. The transformed first digital image cannot be seen. When the bits within each pixel of the combined image are reversed, i.e. the least significant bit (LSB) is exchanged with the most significant bit (MSB), and the resultant image is viewed, then the transformed first digital image is seen. In this way, the transformed first digital image can be hidden inside the noise bits of the first digital image. The method is applied to color pixels by treating each color byte independently. The transformed first digital image can be encrypted before combining with the first digital image. The transformed first digital image can be inversely transformed back to the first digital image for authentication and reconstruction.

11 Claims, 6 Drawing Sheets

(1/16 X)

| | • | 7 |
|---|---|---|
| 3 | 5 | 1 |

| | | • | 7 | 5 |
|---|---|---|---|---|
| 3 | 5 | 7 | 5 | 3 |
| 1 | 3 | 5 | 3 | 1 |

| | | • | 8 | 4 |
|---|---|---|---|---|
| 2 | 4 | 8 | 4 | 2 |
| 1 | 2 | 4 | 2 | 1 |

FIG. 5

METHOD FOR DIGITAL IMAGE ALTERATION DETECTION AND ORIGINAL DIGITAL IMAGE RECOVERY

This application is based on a Provisional Patent Application No. 60/422,635, filed Oct. 30, 2002.

BACKGROUND OF THE INVENTION

The present invention relates generally to the digital imaging arts, and, more specifically, with embedding a transformed digital image within the original digital image to authenticate the original digital image and to reconstruct the original digital image if the original digital image has been altered.

Images captured in electronic form can be easily copied, distributed, and even altered. It can be valuable to identify the integrity of an image. Regardless of how often a digital image is electronically copied or transferred, each digital copy should have embedded therein some indicia of authentication of the digital image.

With the advent of image editing software, the ability to manipulate or otherwise alter a digital image on a pixel by pixel basis is readily available. Thus, there is a strong need to be able to authenticate a digital image in order to determine whether or not the digital image has in fact been altered in some way.

One approach is to include information within the image which is normally not visible, but which can be detected if desired. This information can reveal image alterations.

U.S. Pat. No. 6,128,411 to Keith Knox entitled "Method For Embedding One Or More Digital Images Within Another Digital Image", commonly assigned as the present application and herein incorporated by reference, teaches a method of combining a first digital image with a hidden embedded second digital image, typically a watermark, to serve as authentication for the first digital image. If the first digital image has been altered, then the second watermark digital image, once revealed, will also be altered. However, the Knox patent only serves to detect alteration of a digital image.

If the original data image has been altered, there is an equally strong need to reconstruct the original data image. Ideally, this reconstruction could be achieved from information embedded in the original data image, even if the original data image has been altered.

It is an object of the present invention to provide a hidden embedded second digital image within an original digital image to authenticate the original digital image and to reconstruct the original digital image if the original digital image has been altered.

SUMMARY OF THE INVENTION

In accordance with one aspect of the present invention, a first digital image is combined with a transformed first digital image to authenticate and reconstruct the first digital image. When viewed in the standard manner, the combined image appears to be the first digital image. The transformed first digital image cannot be seen. When the bits within each pixel of the combined image are reversed, i.e. the least significant bit (LSB) is exchanged with the most significant bit (MSB), and the resultant image is viewed, then the transformed first digital image is seen. In this way, the transformed first digital image can be hidden inside the noise bits of the first digital image. The method is applied to color pixels by treating each color byte independently. The transformed first digital image can be encrypted before combining with the first digital image. The transformed first digital image can be inversely transformed back to the first digital image for authentication and reconstruction.

Further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

FIG. 3 illustrates a Floyd and Steinberg error filter.

FIG. 4 illustrates a Jarvis, Judice and Ninke error filter.

FIG. 5 illustrates a Stucki error filter.

DETAILED DESCRIPTION OF THE PREFERRED EMBODIMENT(S)

Figure 1:
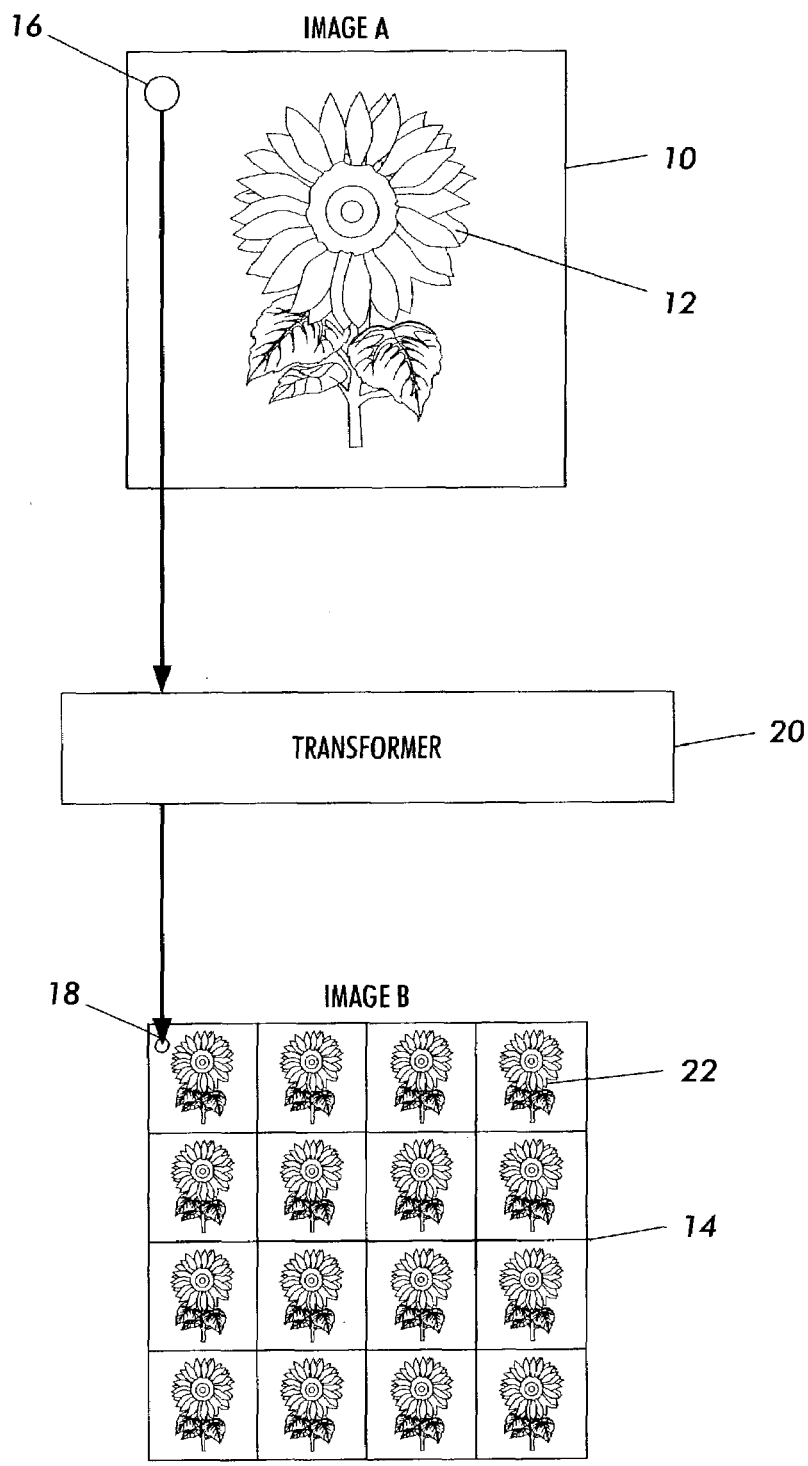
FIG. 1 illustrates how to transform the first original digital image into a second digital image which can authenticate and reconstruct the original digital image.

The following will be a detailed description of the drawings illustrated in the present invention. In this description, the terms "image data" or "pixels" in the form of video image signals, which may be either analog or digital voltage representations of an image, indicate a representation of an image provided from a suitable source. For example, the image signals may be obtained through line by line scanning of an image bearing the original by one or more photosensitive elements, such as an array of charge couple devices commonly referred to as CCDs. Line by line scanning of an image bearing the original for the duration of image data is well known and does not form a part of the present invention.

Image data may also be derived by a computer workstation program in accordance with document creation application software or from a data storage device. In content, the original video image signals may be composed entirely of a single image component such as lines, text, low frequency halftones, high frequency halftones, contones, or any combination thereof.

Image information, be it color or black and white, is commonly derived by scanning, initially at least, in a gray level format containing a large number of gray intensity levels, such as 256 levels for color. In describing the present invention, it is assumed that the video signal has a value in a range between 0 and 255. However, any range from the video signal can be utilized in conjunction with the present invention. Furthermore, in the following description, the term "grey level" will be used to describe both black and white and color applications.

Furthermore, in describing the present invention, the term "pixel" will be utilized. This term may refer to an electrical, (or optical, if fiber optics are used), signal which represents the physical measurable optical properties at a physical definable area on a receiving medium. The receiving medium can be any tangible document, photoreceptor, or marking material transfer medium.

Moreover, the term "pixel" may refer to an electrical, (or optical, if fiber optics are used), signal which represents the physically measurable optical properties at a physically definable area on the display medium. A plurality of the physically definable areas for both situations represent the physically measurable optical properties of an entire physical image to be rendered by either a material marking device, electrically or magnetic marking device, or optical display device.

Lastly, the term "pixel," in the scanning environment, may refer to an electrical, (or optical, if fiber optics are used), signal which represents physical optical property data generated from a signal photosensor cell when scanning a physical image so as to convert the physical optical properties of the physical image to an electronic or electrical representation. In other words, in this situation, a pixel is an electrical (or optical), representation of the physical optical properties of a physical image measured at a physical definable area on an optical sensor.

The term "pixel," in the rendering environment, may refer to an electrical, (or optical, if fiber optics are used), signal which represents the smallest physical area on a recording substrate that can be rendered. In other words, in this situation, a pixel is an electrical, (or optical), representation of the physical spot created by a laser in a laser printed image or the physical spot created by the smallest rendered ink droplet.

With reference to FIG. 1, a first continuous-tone digital image A is stored in a first image buffer or register 10. The image A can be sampled and digitized using a scanner, digital camera, frame grabber, or other digitizing device and then stored on a storage medium such as RAM, ROM, hard drive, magnetic tape, floppy disk, CD, DVD, etc.

The digital image A is conventionally stored as a two-dimensional array of binary numbers in the image buffer 10. The two-dimensional array of binary numbers has X number of picture elements (i.e. pixels) per Y number of raster or scan lines. For example, a 512 by 512 image would have 262,144 picture elements. The stored binary numbers can correspond to different information such as gray scale intensity, luminance, chrominance, etc.

The stored binary numbers represent image information such as gray scale intensity (P). The gray scale intensity values can represent a black-and-white image. Alternatively as in this illustrative example, the gray scale intensity values can represent one of the red, green, and blue components of a color image.

The digital image A can be digitally represented with any number of bits per pixel. Typically, gray scale images are represented with one byte (eight bits) per pixel. This allows each pixel intensity to span a full range from "completely on" to "completely off". For example, in the rendering environment, the "completely on" state signifies black with an intensity value of 0, and the "completely off" state signifies white with an intensity value of 255. A color digital image can be represented with three bytes (24 bits) per pixel where each byte represents the gray scale intensity (P) of one color component (red, green, blue) of the color image. Alternately, the three color components of the digital image can be cyan, magenta, and yellow.

The digital image A in this illustrative embodiment is a flower 12.

The first digital image A will be transformed into a second digital image B in second buffer 14. The intent of the transformation is to redistribute the pixels of image A to new positions within image B. For example, the pixel at location (0, 0) uppermost left pixel 16 of digital image A in first buffer 10 will be transformed into pixel (0, 0) the uppermost left pixel 18 of digital image B in second buffer 14, but pixel (1, 0) the uppermost and second from the left pixel of image A would be mapped to pixel $(x_A/4, 0)$ of image B (the upper left corner of the second subimage) where $X_A$ is the width of the image in pixels. On a pixel-by-pixel basis, the digital image A will be transformed into digital image B.

Digital image B will be used to authenticate the original digital image A and, if digital image A has been altered, digital image B will be used to reconstruct the original digital image A.

The first digital image A has a conventional color 24-bit per pixel image. On a pixel-by-pixel basis, the image A will be input to a transformer 20 which will divide the original digital image A into multiple subsampled images of A which will constitute the digital image B.

The original data image A has an image width $x_A$ and an image height $y_A$. The transformed image B has an image width $x'_B$ and an image height $y'_B$.

The transformation relationship between image A and image B performed by the transformer is expressed as $$B(x', y') = A(x, y) \qquad \text{Equation 1}$$

where $$x' = p*(x \bmod N) + x/N \qquad \text{Equation 2}$$

$$y' = q*(y \bmod N) + y/N \qquad \text{Equation 3}$$

and where $$p = x_A/N \qquad \text{Equation 4}$$

$$q = y_A/N \qquad \text{Equation 5}$$

In the above equations, the (*) operator signifies multiplication, and modulus operator (mod) returns the remainder when the left argument is divided by the right argument.

The parameter N will be any whole number greater than 1. The parameter N determines how many subsampled images of digital image A are formed in digital image B. In the example of N equals 4, the original data image A will be divided into 4 by 4 or 16 smaller or subsampled images of original data image A to form the transformed data image B.

The transformed image B has sixteen flower images 22 arranged in a four by four array. The second digital image B has a conventional color 3 byte, 24-bit per pixel image.

The transformed image B is stored in the second image buffer or register 14. The digital image B is conventionally stored as a two-dimensional array of binary numbers in the image buffer 14.

The first original digital image A is still stored in the first image buffer 10.

Figure 2:
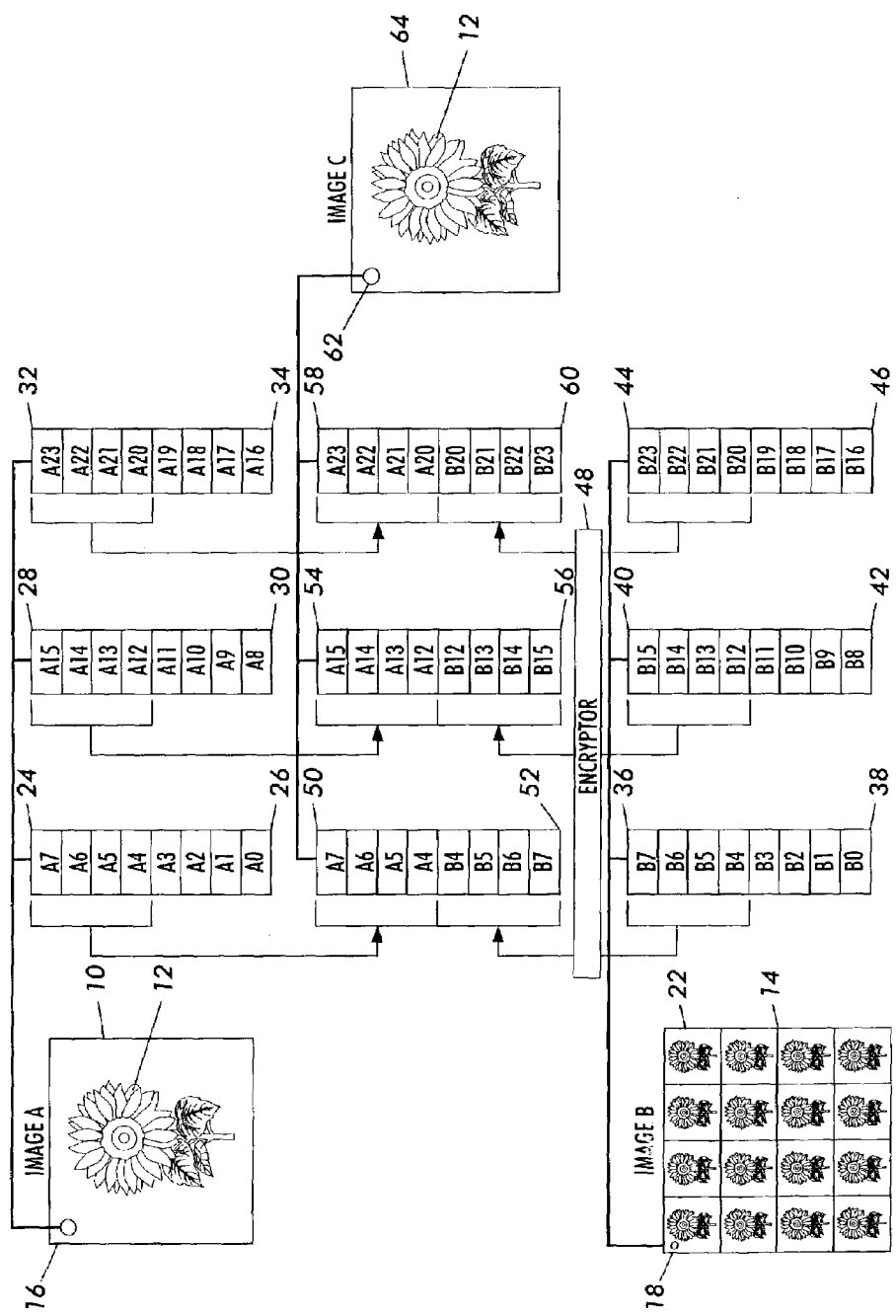
FIG. 2 illustrates how to combine the first original digital image with the second transformed digital image to form a third digital image.

As shown in FIG. 2, the digital images A, B can be represented with any number of bits per picture element (i.e. pixel). In the present illustrative example, the digital images A, B are color images so the digital images will be represented by three bytes of 8 bits per pixel. Thus, digital image A will have a first byte 24 of 8 bits from $A_7$ to $A_0$ for red stored in first buffer 26, a second byte 28 of 8 bits from $A_{15}$ to $A_8$ for green stored in second buffer 30 and a third byte 32 of 8 bits from $A_{23}$ to $A_{16}$ for blue stored in third buffer 34. Digital image B will have a first byte 36 of 8 bits from $B_7$ to $B_0$ for red stored in first buffer 38, a second byte 40 of 8 bits from $B_{15}$ to $B_8$ for green stored in second buffer 42 and a third byte 44 of 8 bits from $B_{23}$ to $B_{16}$ for blue stored in third buffer 46.

Assuming a 24-bit color pixel, the bits in each of the three bytes defining each pixel element are ordered from the most significant bit $A_7$ to the least significant bit $A_0$ for the first byte 24 of the image A; the most significant bit $A_{15}$ to the least significant bit $A_8$ for the second byte 28 of the image A; and the most significant bit $A_{23}$ to the least significant bit $A_{16}$ for the third byte 32 of the images A; where the more significant bits (MSBs) typically represent captured image information and the less significant bits (LSBs) essentially represent random noise.

Similarly, the bits in each of the three bytes defining each pixel element are ordered from the most significant bit $B_7$ to the least significant bit $B_0$ for the first byte 36 of the image B; the most significant bit $B_{15}$ to the least significant bit $B_8$ for the second byte 40 of the image B; and the most significant bit $B_{23}$ to the least significant bit $B_{16}$ for the third byte 44 of the image B; where the more significant bits (MSBs) typically represent captured image information and the less significant bits (LSBs) essentially represent random noise.

The term "the upper order bits" hereafter refers to one or more of the bits forming the upper or most significant half of a pixel, while the term "the lower order bits" hereafter refers to one or more of the bits forming the lower or least significant half of a pixel.

For example, the upper order bits MSBs of the 3 byte 8-bits of the pixel 16 for digital image A are the $A_7$ to $A_4$ bits; the $A_{15}$ to $A_{12}$ bits; and the $A_{23}$ to $A_{20}$ bits; while the lower order bits LSBs on the 3 byte 8-bits of the pixel 16 are the $A_3$ to $A_0$ bits; the $A_{11}$ to $A_8$ bits; and the $A_{19}$ to $A_{16}$ bits.

For example, the upper order bits MSBs of the 3 byte 8-bits of the pixel 18 for digital image B are the $B_7$ to $B_4$ bits; the $B_{15}$ to $B_{12}$ bits; and the $B_{23}$ to $B_{20}$ bits; while the lower order bits LSBs on 3 byte 8-bit of the pixel 18 are the $B_3$ to $B_0$ bits; the $B_{11}$ to $B_8$ bits; and the $B_{19}$ to $B_{16}$ bits.

The original digital image A in buffer 10 and the transformed multiple subsampled digital image B in buffer 12 can be combined into a single digital image C which appears visibly to be the image A but with the digital image B hidden embedded within the single digital image.

Prior to combination of the digital images A and B, the digital image B can be encrypted by an encryptor 48. On a pixel-by-pixel basis, the digital image B can be encrypted by known encryption methods. Encryption of the image B adds an additional authentication layer for digital image A and prevents alteration of the multiple subsampled images in image B. For ease of understanding, the digital image B and the encrypted image W will be referred to as the digital image B.

With both digital images A, B stored as described above in buffers, the images can then be combined into a single digital output image C by combining the most significant bits of both digital input images A, B on a pixel-by-pixel basis starting with the upper left pixel 16, 18 of each digital image.

The data representing the intensity of the upper left pixel 16 of image A is clipped to the range 0 to 255 (as described further below), reduced to three bytes, and stored in the three input pixel buffers 26, 30 and 34. The first byte 50 for image C has 8 bits from $C_7$ to $C_0$. The four most significant bits (MSBs) of data ($A_7$-$A_4$) of the first byte 24 of image A in the first buffer 26 are then copied into the four most significant bits (MSBs) of the first byte 50 of image C in the first output pixel buffer 52 in the same bit order.

That is bit $A_7$ in the first byte 24 in the buffer 20 becomes bit $A_7$ in the $C_7$ position in the first byte 40 in the first buffer 52, bit $A_6$ in the first byte 24 in the buffer 26 becomes bit $A_6$ in the $C_6$ position in the first byte 50 in the first buffer 52, bit $A_5$ in the first byte 24 in the buffer 26 becomes bit $A_5$ in the $C_5$ position in the first byte 50 in the first buffer 52, and bit $A_4$ in the first byte 24 in the buffer 26 becomes bit $A_4$ in the $C_4$ position in the first byte 50 in the first buffer 52.

Likewise, the data representing the intensity of the upper left pixel 18 of image B is clipped to the range 0 to 255, reduced to three bytes, and stored in the three input pixel buffers 38, 42, and 46. The four most significant bits (MSBs) of data ($B_7$-$B_4$) of the first byte 36 of image B from the first buffer 38 are then copied into the four least significant bits (LSBs) of the first byte 50 in the first output pixel buffer 52 in reverse bit order.

That is bit $B_7$ of first byte 36 in the first buffer 38 becomes bit $B_7$ in position $C_0$ in first byte 50 in the first buffer 52, bit $B_6$ of first byte 36 in the first buffer 38 becomes bit $B_6$ in position $C_1$ in first byte 50 in the first buffer 52, bit $B_5$ of first byte 36 in the first buffer 38 becomes bit $B_5$ in position $C_2$ in first byte 50 in the first buffer 52, and bit $B_4$ of first byte 36 in the first buffer 38 becomes bit $B_4$ in position $C_3$ in first byte 50 in the first buffer 52.

The first byte 50 of image C in the first buffer 52 has 8 bits with $A_7$, $A_6$, $A_5$, $A_4$, $B_4$, $B_5$, $B_6$, $B_7$, in bits from $C_7$ to $C_0$. In effect, the 8-bit pixel intensity information for image B is hidden within the noise bits of the pixel intensity information for image A in combined image C.

The four most significant bits (MSBs) of data ($A_{15}$-$A_{12}$) from the second byte 28 of image A in the second buffer 30 are then copied into the four most significant bits of a second byte 54 of image C in the second output pixel buffer 56 in the same bit order.

That is bit $A_{15}$ of second byte 28 in the second buffer 30 becomes bit $A_{15}$ in the $C_{15}$ position in the second byte 54 in the second buffer 56, through bit $A_{12}$ of second byte 28 in the second buffer 30 becomes bit $A_{12}$ in the $C_{12}$ position in the second byte 44 in the second buffer 56.

The four most significant bits of data ($B_{15}$-$B_{12}$) from the second byte 40 of image B from the second buffer 42 are then copied into the four least significant bits of the second byte 54 of image C in the second output pixel buffer 56 in reverse bit order. That is bit $B_{15}$ of second byte 40 in the second buffer 42 becomes bit $B_{15}$ in the $C_8$ position in the second byte 54 in the second buffer 56, through bit $B_{12}$ of second byte 40 in the second buffer 42 becomes bit $B_{12}$ in the $C_{11}$ position in the second byte 54 in the second buffer 56.

The second byte 54 of image C in the second buffer 56 has 8 bits with $A_{15}$, $A_{14}$, $A_{13}$, $A_{12}$, $B_{12}$, $B_{13}$, $B_{14}$, $B_{15}$, in bits from $C_{15}$ to $C_8$.

The four most significant bits (MSBs) of data ($A_{23}$-$A_{20}$) from the third byte 32 of image A in the third buffer 34 are then copied into the four most significant bits of the third byte 58 of image C in the third output pixel buffer 60 in the same bit order. That is bit $A_{23}$ in the third byte 32 in the third buffer 34 becomes bit $A_{23}$ in the $C_{23}$ position in the third byte 58 in the third buffer 60, through bit $A_{20}$ in the third byte 32 in the third buffer 34 becomes bit $A_{20}$ in the $C_{20}$ position in the third byte 58 in the third buffer 60.

The four most significant bits of data ($B_{23}$-$B_{20}$) from the third byte 44 of image B from the third buffer 46 are then copied into the four least significant bits of the third byte 58 of image C in the third output pixel buffer 60 in reverse bit order. That is bit $B_{23}$ of the third byte 44 in the buffer 46 becomes bit $B_{23}$ in the position $C_{16}$ in the third byte 58 in the third buffer 60, through bit $B_{20}$ of the third byte 44 in the buffer 46 becomes bit $B_{20}$ the position $C_{19}$ in the third byte 58 in the third buffer 60.

The third byte 58 of image C in the third buffer 60 has 8 bits with $A_{23}, A_{22}, A_{21}, A_{20}, B_{20}, B_{21}, B_{22}, B_{23}$, in bits from $C_{23}$ to $C_{16}$.

Since the input digital images A, B are color images, each color byte is treated individually in the manner described above. That is, the red color bytes from digital images A and B can be combined to produce a red output color byte for image C; the blue color bytes from the digital images A and B can be combined to produce a blue output color byte for image C; and the green color bytes from the digital images A and B can be combined to produce a green output color byte for image C.

Thus, the four most significant bits (MSBs) from each of the three bytes of each pixel 16, 18 are copied from each image and combined to form a 3 byte 8-bit output pixel 62 for image C in buffer 64 where the four most significant bits from the 3 bytes from the pixel 16 form the four most significant bits of the 3 bytes of the output pixel 62 and the four most significant bits from the 3 bytes of the pixel 18 are reversed in order and form the four least significant bits of the three bytes of the output pixel 62. The combined output pixel 62 is then copied into an output image buffer 64.

By creating the output pixel 62, an error has been made. That is, the value of the output pixel 62 is not equal to the value of the original image pixel 16, nor equal to the value of the transformed pixel 18. Thus, a standard multilevel error diffusion process is then performed. That is, the difference between the intensity value of the output pixel 62, stored in buffer 64, and the intensity value of the "unclipped" input pixel 16, stored in buffer 10, is determined. The resulting difference value is then distributed to the pixels neighboring and/or adjoining pixel 16 in image A.

FIGS. 3 to 5 show a number of conventional error filters that can be used to distribute the difference value between the input and output pixels 16, 26. In particular, FIG. 3 shows a Floyd and Steinberg error filter which divides the difference value into sixteenths and weights the difference distribution among four adjoining image A pixels as shown. FIG. 4 shows a Jarvis, Judice, and Ninke error filter which divides the difference value into forty-eighths and weights the difference distribution among twelve adjoining and neighboring image A pixels as shown. FIG. 5 shows a Stucki error filter which divides the difference value into forty-seconds and weights the difference distribution among twelve adjoining and neighboring image A pixels as shown. The modified image pixels are subsequently used to produce the combined output image in the same manner as described with the first pixel 16.

In addition to diffusing difference values among adjoining and neighboring pixels with the above-described error diffusion algorithm, other error diffusion algorithms can be used, including those known to enhance edges. An exemplary method of enhancing the edges of an image is described and claimed in commonly-assigned and incorporated by reference U.S. Pat. No. 5,045,952, to Reiner Eschbach entitled "Method for Edge Enhanced Error Diffusion".

It should be appreciated that when the weighted difference errors are distributed, the values of the adjoining/neighboring pixels may increase above the upper limit value of 255, or decrease below the lower limit value of 0. In both cases, more than a single byte (8 bits) is required to store the combined input pixel and distributed error. It is contemplated that the distributed errors can be stored in a secondary data buffer (not shown) for subsequent use when the pixel is eventually processed, or the data buffer 10 can simply be provided with the capacity to store more than a single byte (8 bits) of data for each image pixel.

When a pixel having a value above 255 is subsequently processed, the pixel value is first clipped or otherwise set to 255 prior to being copied into the input pixel buffers 26, 30 and 34. Likewise, when a pixel having a value below 0 is processed, the pixel is first clipped or otherwise set to 0 when the pixel is copied into buffers 26, 30 and 34.

The multilevel error diffusion performed on image A should only affect the most significant bits of image C. Error diffusion should not be applied to image B. Note, however, that the modification of image A means that image B is no longer an exact transformation of image A. One can simply recognize and ignore these differences in the image authentication and reconstruction processes, or attempt to revise image B to match the altered image A. But if image B is changed, then some of the error values used in the error diffusion of image A will be altered as well. This means that one may need to iterate the steps of error diffusing image A to change the most-significant bits of image C, transforming image A to form image B, and updating the least-significant bits of image C.

At any time after its formation, digital image C can be authenticated as a true unaltered duplicate of digital image A. Digital image C will be reformed on a pixel-by-pixel basis as digital image B which is inverse transformed to digital image A.

Figure 6:
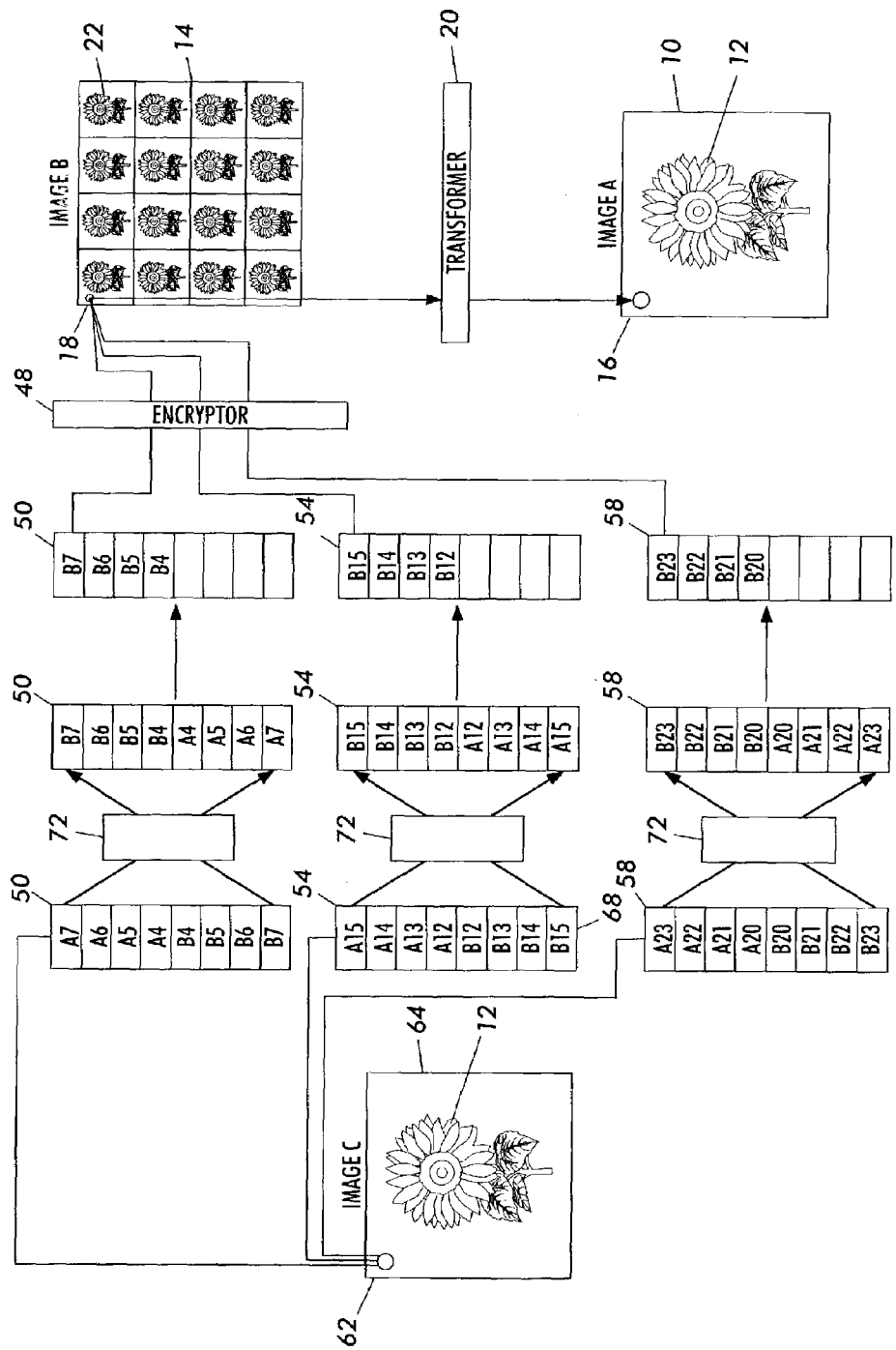
FIG. 6 illustrates the authentication of the third digital image as a true unaltered duplicate of the first original digital image.

A pixel 62 from image C is stored in image buffer 64 in FIG. 6. Digital image C is a color image so pixel 62 is a 24 bit pixel of 3 bytes 50, 54 and 58 of 8 bits per byte.

The first byte 50 of image C in the first buffer 66 has 8 bits with $A_7, A_6, A_5, A_4, B_4, B_5, B_6, B_7$, in bits from $C_7$ to $C_0$.

The second byte 54 of image C in the second buffer 68 has 8 bits with $A_{15}, A_{14}, A_{13}, A_{12}, B_{12}, B_{13}, B_{14}, B_{15}$, in bits from $C_{15}$ to $C_8$.

The third byte 58 of image C in the third buffer 70 has 8 bits with $A_{23}, A_{22}, A_{21}, A_{20}, B_{20}, B_{21}, B_{22}, B_{23}$, in bits from $C_{23}$ to $C_{16}$.

Each byte in the buffer will be separately bit-reversed by bit-reversal program 72. Thus, the first byte 50 will be bit-reversed to $B_7, B_6, B_5, B_4, A_4, A_5, A_6, A_7$, in bits from $C_7$ to $C_0$. The second byte 54 will be bit-reversed to $B_{15}, B_{14}, B_{13}, B_{12}, A_{12}, A_{13}, A_{14}, A_{15}$, in bits from $C_{15}$ to $C_8$. The third byte 58 will be bit-reversed to $B_{23}, B_{22}, B_{21}, B_{20}, A_{20}, A_{21}, A_{22}, A_{23}$, in bits from $C_{23}$ to $C_{16}$.

The lower order bits of the first byte 50 $A_4, A_5, A_6$, and $A_7$ can be subsequently ignored or deleted by the bit-reversal program 72 or a separate bit-deletion program (not shown). The lower order bits of the second byte 54 $A_{12}, A_{13}, A_{14}$, and $A_{15}$ can be subsequently ignored or deleted by the bit-reversal program or a separate bit-deletion program. The lower order bits of the third byte 58 $A_{20}, A_{21}, A_{22}$, and $A_{23}$ can be subsequently ignored or deleted by the bit-reversal program or a separate bit-deletion program.

The first byte 50 now consists of $B_7, B_6, B_5$, and $B_4$ in bits from $C_7$ to $C_4$. The second byte 54 now consists of $B_{15}, B_{14}, B_{13}$, and $B_{12}$ in bits from $C_{15}$ to $C_{12}$. The third byte 58 now consists of $B_{23}, B_{22}, B_{21}$, and $B_{20}$ in bits from $C_{23}$ to $C_{20}$.

The three partial bytes 50, 54, 58 of digital image C will then be decrypted by encryptor 48, if the bytes had originally been encrypted.

The three partial bytes 50, 54 and 58 of digital image C will then be formed into a pixel 18 of digital image B in buffer 14. When completely formed by all the pixels, digital image B will constitute multiple subsampled images 22 of digital image A.

Digital image B will be inversely transformed through transformer 24 by Equations 1 to 5, as previously detailed, to constitute digital image A in buffer 10.

The three bytes of pixel 18 of digital image B will be transformed into pixel 16 of digital image A. On a pixel-by-pixel basis, digital image C will be reconstructed as digital image B which will be reconstructed and transformed into digital image A.

Digital image A will be compared with digital image C to determine the authentication of digital image C. The loss of the four least significant bits (LSBs) of image B when the pixel of image C is bit-reversed and the four bits of A are deleted or ignored will be a negligible loss in the sharpness of the image B and the image A and a negligible loss in the shift of color of image B and image C.

Similarly, any loss of sharpness or loss in the shift of color due to not reversing the error diffusion will be negligible.

The reformation of digital image A is to check the authentication of digital image C so negligible errors are acceptable.

The combined output image C can be electronically copied and transferred without destroying the hidden image embedded therein. One important application of the above described process is image authentication and image reconstruction wherein the original digital image (i.e. image A) includes an authentication and reconstruction pattern (i.e. image B) hidden embedded therein in the manner described above.

In the event that a user alters the digital image C, such as with image editing software (Paint Shop Pro by JASC, Photo Shop by Adobe, etc.), the embedded authentication mark of digital image B would also be altered indicating that the original image C is not authentic and has in fact been tampered with.

Figure 7:
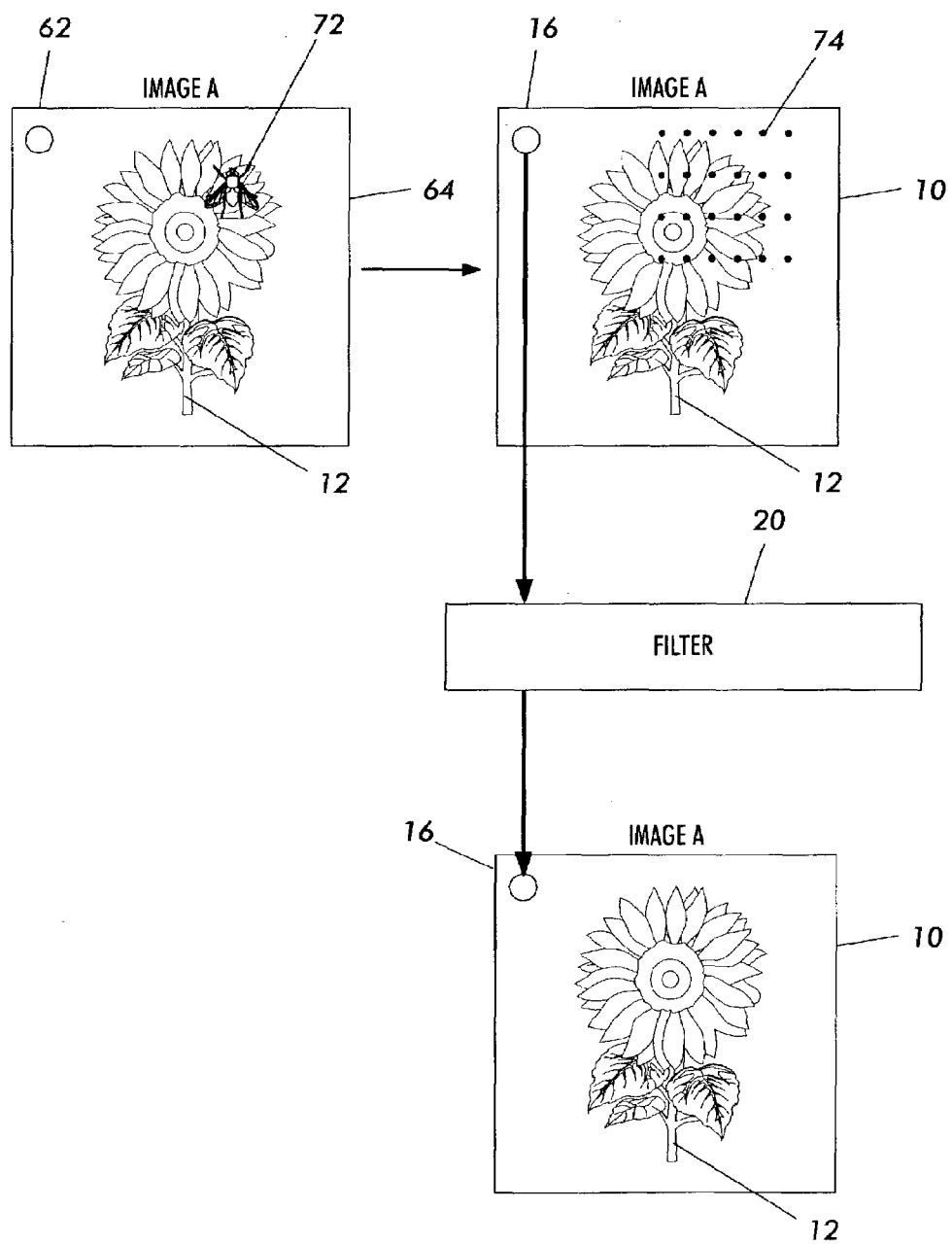
FIG. 7 illustrates an altered third digital image which is reconstructed as the first original digital image.

For example, assume that an original digital image of a flower 12 (i.e. image A) is embedded with an authentication mark or pattern (i.e. image B) in the manner described above to form combined digital image C as shown in FIG. 7. Image editing software can then be used to alter the original image by, for example, electronically inserting a bee 72 on the flower 12. The pixels representing the bee 72 do not have the higher order authentication mark pixel bits embedded therein. Thus, when a utility program is used to bitwise reorder the pixels of the digital image, the result is an altered authentication mark indicting that the original image is no longer authentic.

Combined digital image C has been altered to show the flower image 12 with the altered image of a bee 72 on the flower as seen in FIG. 7.

After the bit-reversal, any decryption, the formation of the embedded, hidden subsampled image B, and the inverse transformation, authentication image A results, as previously described above.

The alteration in digital image C causes isolated pixel 74 changes in the authentication and reconstruction image A. Optionally, a noise removing filter 74 such as a median filter or other method of restoration of a image pixel from the values of its neighborhood is applied to the pixels 16 on a pixel-by-pixel basis for the entire digital image of altered digital image A to reconstruct the original digital A with just the flower image 12. The median filter will remove the alteration of the bee 74 which is the difference between altered digital image C and authentic digital image A to reconstruct the original digital image A.

Figure 8:
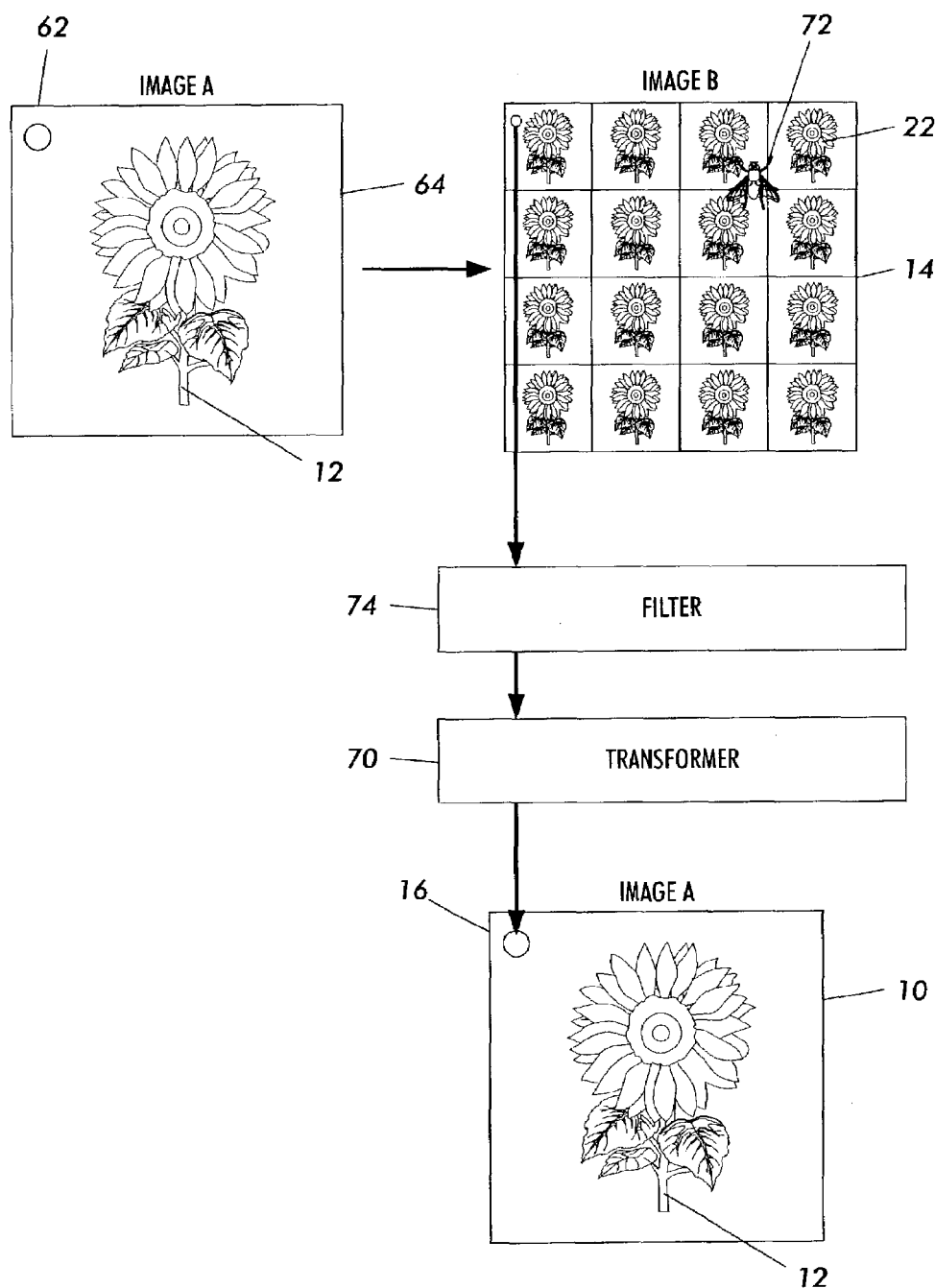
FIG. 8 illustrates an altered third digital image which is reconstructed by a second method as the first original digital image.

Alternately as shown in FIG. 8, the altered digital image C can be transformed directly into a second transformed image B that incorporates the alteration 72 in the subsampled images 22. Thresholding by comparing the absolute difference between FIGS. 8 and 9 against a constant value greater that the differences due to the altered least significant bits, or the error diffusion (e.g. 64) yields FIG. 10. Again, an image reconstruction method such as a noise removing filter 74 (e.g. a median filter) can optionally be applied to the pixels 18 on a pixel-by-pixel basis of altered digital image B to reconstruct the original digital image B with just the subsampled images of the flower image. Digital image B is then inverse transformed 20 into original digital image A with just the original image 12.

Both methods of FIG. 7 and FIG. 8 for determining the region of image alteration can be carried out and a net region of alteration that includes the region indicated as altered by both methods can be defined as the limited area of alteration. It is the pixels in the limited area of alteration of image C that should be restored using the A image data reconstructed from image B. For the few pixels in image A that lie within the limited area of alteration, but cannot be trusted because they are reconstructed from pixels in image B that are also in the limited area of alteration, image restoration techniques can be used. These include techniques such as interpolation or median filtering that construct estimations for the missing values from the from their neighboring pixel values.

This invention provides a method for detecting when a digital image is altered and (if the alterations are not too extensive) of recovering a close approximation of the original image. If the presented and hidden digital images do not match, then the presented image has been altered. Furthermore, the transformed image can be used to replace the information in the altered region, thereby recovering the original image.

Simply storing a checksum or some other characteristic of the image allows one to detect alteration, but since the same digital image data is destroyed, it does not allow recovery of the original digital image. However, if the original image is transformed and stored in such a way that the image information is moved and/or distributed prior to being hidden, then the information destroyed when the visible digital image is altered may be different from the information destroyed in the hidden digital image. The information needed to restore the original image may still be available in the hidden digital image, enabling original digital image recovery.

Since the input digital images A, B are color images, each color byte from digital images A, B is combined to form that color byte for combined image C in the manner described above. It is also contemplated that different color bytes can be combined. For instance, the red color byte of the first digital image A can be combined with the green color byte of the second digital image B, etc.

The method of embedding at least one hidden digital image within another digital image of the present invention can be implemented in hardware, software, firmware, or any combination thereof. Further, any number of hardware buffers or software buffers may be used to accomplish the method of embedding at least one hidden digital image within another digital image of the present invention.

Additional methods for combining the first and second input pixels 16, 18 into the output pixel 62 are contemplated. For instance, rather than reversing the order of the twelve most significant bits of the second image, the upper twelve bits of each image can be placed into the upper and lower twelve bit locations of the output pixel without reversing the order of the bits placed in the lower 12 bits of the combined image. To see the hidden image, the upper and lower 12 bits of the combined image are simply swapped and the result is viewed. The error diffusion methods are run in the same manner as before, except that now the combined image is made without reversing the bit order.

Further, it is contemplated that the output pixel 62 can be comprised of unequal numbers of bits from the input pixels 16, 18. Thus, the hidden image B can have fewer than the described twelve bits. For example, the combined pixel can include 18 bits from pixel 16 and only six bits from pixel 18.

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of combining a first digital image and a second digital image into a combined digital image to authenticate and reconstruct said first digital image, the method comprising the steps of:
   a) transforming said first digital image into a second digital image;
   b) combining at least one bit of a first pixel associated with said first digital image with at least one second bit of a corresponding second pixel associated with said second digital image to form a corresponding output pixel of the combined digital image;
   c) distributing a difference value between said first pixel and said output pixel among a plurality of pixels located proximate said first pixel; and
   d) repeating steps b) and c) for each of the pixels of said first digital image and said second digital image, said combined digital image having the same digital image as said first digital image,
   wherein a copy of the combined digital image is processed to determine if the copy is altered relative to the first digital image, and
   if the copy is determined to be altered, a copy of the second digital image is extracted from the altered copy and transformed into a reconstructed version of the first digital image that is substantially identical to the first digital image.

2. The method of claim 1, wherein step a) spatially disperses the pixels of the first digital image into the pixels of the second digital image.

3. The method of claim 2, wherein the spatial dispersion creates multiple subsampled images and forms the second digital image based on the subsampled images.

4. The method of claim 1, wherein step b) includes the step of:
   e) combining at least the most significant data bit of said first pixel with at least the most significant data bit of said second pixel to form said output pixel.

5. The method of claim 1, wherein the higher order bits of said first pixel form the higher order bits of said output pixel and the higher order bits of said second pixel form the lower order bits of said output pixel.

6. The method of claim 1, wherein the four most significant bits of said first pixel form the four most significant bits of said output pixel and the four most significant bits of said second pixel form the four least significant bits of said output pixel.

7. The method of claim 1, wherein step b) includes the steps of:
   e) combining a plurality of bits of said first pixel with a plurality of second bits of said second pixel to form the corresponding output pixel; and
   f) reordering the bit order of said plurality of second bits prior to step e).

8. The method of claim 7, wherein step f) includes the step of:
   g) reversing the bit order of the plurality of second bits.

9. The method of claim 1, further including the step of:
   e) repeating steps a) to d) for each color byte of the first and second digital images.

10. The method of claim 1, further including the step of:
    e) prior to step a), limiting the values of the first and second pixels to within a predetermined range of values.

11. The method of claim 1, further including the step of:
    e) prior to step b), encrypting the bits of said second pixel prior to combining at least one bit of a first pixel associated with said first digital image with at least one second bit of a corresponding second pixel associated with said second digital image.

* * * * *